United States Patent
Okuda

(10) Patent No.: US 7,359,808 B2
(45) Date of Patent: Apr. 15, 2008

(54) FUEL CELL EVALUATION METHOD AND FUEL CELL EVALUATION APPARATUS

(75) Inventor: Hiroshi Okuda, Hyogo (JP)

(73) Assignee: ESPEC Corp., Tenjinbashi Kita-ku, Osaka (JP)

( * ) Notice: Subject to any disclaimer, the term of this patent is extended or adjusted under 35 U.S.C. 154(b) by 288 days.

(21) Appl. No.: 10/882,344

(22) Filed: Jul. 2, 2004

(65) Prior Publication Data

US 2005/0096858 A1    May 5, 2005

(30) Foreign Application Priority Data

Oct. 31, 2003    (JP) .............................. 2003-373065

(51) Int. Cl.
    *G01R 31/36*    (2006.01)

(52) U.S. Cl. .......................... 702/63; 702/57; 702/64; 702/65; 702/108; 702/113; 702/127; 429/23; 429/25; 700/287

(58) Field of Classification Search .................. 702/63, 702/57, 108, 64, 65, 113, 127; 429/21, 23, 429/25, 26; 700/286, 287
See application file for complete search history.

(56) References Cited

U.S. PATENT DOCUMENTS

| | | | |
|---|---|---|---|
| 4,904,547 A * | 2/1990 | Mizumoto et al. ............ 429/22 |
| 5,518,831 A * | 5/1996 | Tou et al. ...................... 429/42 |
| 6,436,562 B1 * | 8/2002 | DuBose ........................ 429/13 |
| 6,889,147 B2 * | 5/2005 | Gopal et al. .................. 702/63 |
| 6,978,224 B2 * | 12/2005 | Gopal ......................... 702/182 |
| 2002/0045080 A1 * | 4/2002 | Andou et al. ................. 429/20 |
| 2003/0129465 A1 * | 7/2003 | Nakamura et al. ............ 429/26 |
| 2004/0018404 A1 * | 1/2004 | Kojima et al. ................ 429/22 |
| 2004/0137292 A1 * | 7/2004 | Takebe et al. ................ 429/23 |

FOREIGN PATENT DOCUMENTS

JP    64-024366    1/1989

* cited by examiner

*Primary Examiner*—Hal Wachsman
*Assistant Examiner*—Phuong Huynh
(74) *Attorney, Agent, or Firm*—Harness, Dickey & Pierce, P.L.C.

(57) ABSTRACT

A fuel cell evaluation apparatus of the present invention is provided with a fuel cell for generating electricity using fuel gas and oxidizer gas; a fuel gas supplying section for supplying the fuel gas; an oxidizer gas supplying section for supplying the oxidizer gas; an inert gas supplying section; a detector for detecting an amount of electricity generated by the fuel cell; a bypass for interconnecting a gas supply port of the fuel cell with a gas exhaust port of the fuel cell; three-way valves for switching the gas to either the fuel cell and the bypass; and a control section for controlling at least one of the three-way valves so as to replace the gas inside the fuel cell. The fuel cell evaluation apparatus and a fuel cell evaluation method of the present invention can evaluate the properties and performance of a fuel cell in a nondestructive manner.

19 Claims, 13 Drawing Sheets

FUEL CELL EVALUATION METHOD AND FUEL CELL EVALUATION APPARATUS

This Nonprovisional application claims priority under 35 U.S.C. § 119(a) on Patent Application No. 373065/2003 filed in Japan on Oct. 31, 2003, the entire contents of which are hereby incorporated by reference.

FIELD OF THE INVENTION

The present invention relates to a fuel cell evaluation method and a fuel cell evaluation apparatus, which are appropriately used for evaluating the quality of a fuel cell in the process of research and development, production, inspection, and quality control of the fuel cell.

BACKGROUND OF THE INVENTION

As methods for evaluating the quality and performance of a fuel cell, the following methods (1) through (4) are conventionally known.

(1) Measurement of Tafel Plot (Tafel Gradient) while Varying Flow Rates of Fuel and Oxidizer Though it is possible to evaluate the performance of a fuel cell as a whole with this evaluation method (1), it is not possible to specify a defective point and content with respect to each of components in the fuel cell.

(2) Measurement of Cole-Cole Plot

This method (2) is a transient analysis of electrode reaction. In an AC impedance method, a transfer function of the electrode reaction is determined in such a manner that a voltage (or current) signal is supplied to the electrode and then the resultant response current (or voltage) is compared to the sinusoidal input. Here, the Cole-Cole plot is corrected in this method (2) using a coefficient β as indicated by the following equation (I).

$$Z = R_{so1} + R_{ct}/\{1 + (j2\pi f R_{ct} C_{d1})\beta\} \quad (I)$$

With this method (2), it is possible to obtain a certain degree of internal information of a fuel cell by supplying a measurement frequency.

However, the internal information is not directly related to the quality of the fuel cell. Further, the correlation between the internal information and the quality of the fuel cell involves many hypotheses. Accordingly, data of a particular measurement result is not uniquely interpreted. Therefore it is not possible to realize the measurement correctly.

Further, with the method (2), it is possible to specify a defective point, and a part (electrode, separator, electrolytic membrane, etc.) of the fuel cell that differs from another non-defective fuel cell, but it is not possible to specify in further detail where and to what extent the point and part is defective.

Further, with the method (2), it takes not less than 100 seconds to measure a fuel cell, and an internal state of the fuel cell, such as a gas supply rate and temperature, changes during the measurement. This causes a problem that either it is difficult to realize the measurement correctly or it is impossible to realize the measurement.

(3) Impedance Measurement by an AC Four-Terminal Method using a Specific Frequency This measurement method (3) provides a measurement result of only one physical property value, and provides only one index for evaluating an overall state of a fuel cell.

(4) Current Interruption Method

This evaluation method (4) is implemented by instantaneously interrupting a cell load current, and then measuring a transient characteristic of voltage rise that is caused by an induced current generated in the instantaneous interruption. This measurement is performed to obtain information inside the cell, and to obtain, in particular, information of an interface of an electrolytic membrane.

With this evaluation method (4), it is possible to specify a defective point, and a part (electrode, separator, electrolytic membrane, etc.) of the fuel cell that differs from another non-defective fuel cell. In this evaluation method (4), however, a counter current (reverse bias) generated by interrupting the load damages the fuel cell.

In order to reduce the damage, also devised is a method (5) of rapidly lowering the current to a certain degree of value instead of completely interrupting the current.

However, a difference between the method (5) and the method (4) is only an extent of current to be interrupted. Namely, the method (5) is substantially the same with the current interruption method (4).

Tokukaisho 64-24366 (published on Jan. 26, 1989) discloses a method for detecting a defective cell in a phosphoric acid fuel cell.

This detection method is used for detecting whether or not a single cell or a block of cells as a unit is defective in a cell stack, and not for correctly evaluating the properties of a fuel cell.

As described above, the foregoing conventional methods have a problem that it is difficult to correctly evaluate the properties of a fuel cell.

SUMMARY OF THE INVENTION

The present invention has an objective to provide a fuel cell evaluation method and fuel cell evaluation apparatus for evaluating the properties and performance of a fuel cell in a nondestructive manner.

In order to achieve the foregoing objective, a method for evaluating a fuel cell of the present invention is arranged so as to sequentially include the steps of (i) setting an inside of the fuel cell to an inert gas atmosphere; and (ii) introducing into the fuel cell at least one of fuel gas and oxidizer gas in such a manner that an amount of electricity generated by the fuel cell changes, so as to detect changes of the amount of electricity generated by the fuel cell over time.

Note that, the inert gas atmosphere refers to an atmosphere whose combination of gas does not cause electricity generation inside the fuel cell, and the combination of gas may be inert gas and inert gas, inert gas and oxidizer gas, or fuel gas and inert gas, for example.

In order to achieve the foregoing objective, another method for evaluating a fuel cell of the present invention is arranged so as to sequentially include the steps of (i) setting an inside of the fuel cell to at least one of a fuel gas atmosphere and an oxidizer gas atmosphere; and (ii) introducing inert gas into the fuel cell that is generating electricity, so as to detect changes of an amount of electricity generated by the fuel cell over time.

In order to achieve the foregoing objective, a further method for evaluating a fuel cell of the present invention is arranged so as to sequentially include the steps of (i) introducing into the fuel cell at least one of fuel gas and oxidizer gas so as to cause the fuel cell to generate electricity; and (ii) decreasing or increasing a concentration of the at least one of fuel gas and oxidizer gas in the fuel cell at predetermined speed by introducing inert gas, so as to detect changes of an amount of electricity generated by the fuel cell over time.

With these foregoing methods, it is therefore possible to more surely learn in accordance with the obtained information, the properties and performance of the fuel cell, thereby evaluating the fuel cell more accurately.

In order to achieve the foregoing objective, a fuel cell evaluation apparatus of the present invention is arranged so as to include a fuel cell for generating electricity using fuel gas and oxidizer gas; a fuel gas supplying section for supplying the fuel gas; an oxidizer gas supplying section for supplying the oxidizer gas; an inert gas supplying section for supplying inert gas; a detection section for detecting an amount of electricity generated by the fuel cell; a bypass for interconnecting a gas supply port of the fuel cell with a gas exhaust port of the fuel cell; a first switching valve provided in the vicinity of the gas supply port of the fuel cell, the first switching valve supplying to either the gas supply port or the bypass, one or more of the fuel gas, the oxidizer gas, and the inert gas; a second switching valve provided in the vicinity of the gas exhaust port of the fuel cell, the second switching valve discharging one or more of the fuel gas, the oxidizer gas, and the inert gas supplied from either the gas exhaust port or the bypass; and a control section for replacing one or more of the fuel gas, the oxidizer gas, and the inert gas inside the fuel cell by controlling at least one of the first switching valve and the second switching valve.

With this arrangement, the amount of electricity generated by the fuel cell is detected when an amount of at least one of the fuel gas and the oxidizer gas is changed. Therefore it is possible to obtain information about states of the fuel cell in each of the processes as described above.

With this arrangement, it is therefore possible to more surely learn the properties and performance of the fuel cell, thereby evaluating the fuel cell more accurately.

Further, in this arrangement, by means of the control section, the first switching valve, and the second switching valve, gas inside the bypass and inside the gas flow paths from the gas supplying sections to the first switching valve are replaced with gas that differs from gas inside the fuel cell, before the first and second switching valves are switched. With this, it is possible to smoothly and more precisely replace gas inside the fuel cell with another gas.

Namely, with this arrangement, it is possible to detect an amount of electricity generated in the fuel cell by smoothly and more precisely replacing the gas inside the fuel cell with another gas as described above. Therefore it is possible to more accurately obtain information about states (for example, properties and performance) of the fuel cell with respect to each of the processes as described above.

With this arrangement, it is therefore possible to more surely learn the properties and performance of the fuel cell, thereby evaluating the fuel cell more accurately.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) shows measurement results of an analysis example, and FIG. 6(b) shows results obtained by converting the measurement results.

FIG. 9(a) shows measurement results of an analysis example, and FIG. 9(b) shows results obtained by converting the measurement results.

DESCRIPTION OF THE EMBODIMENTS

The following will explain embodiments of the present invention with reference to FIGS. 1 through 14.

[First Embodiment]

Figure 1:
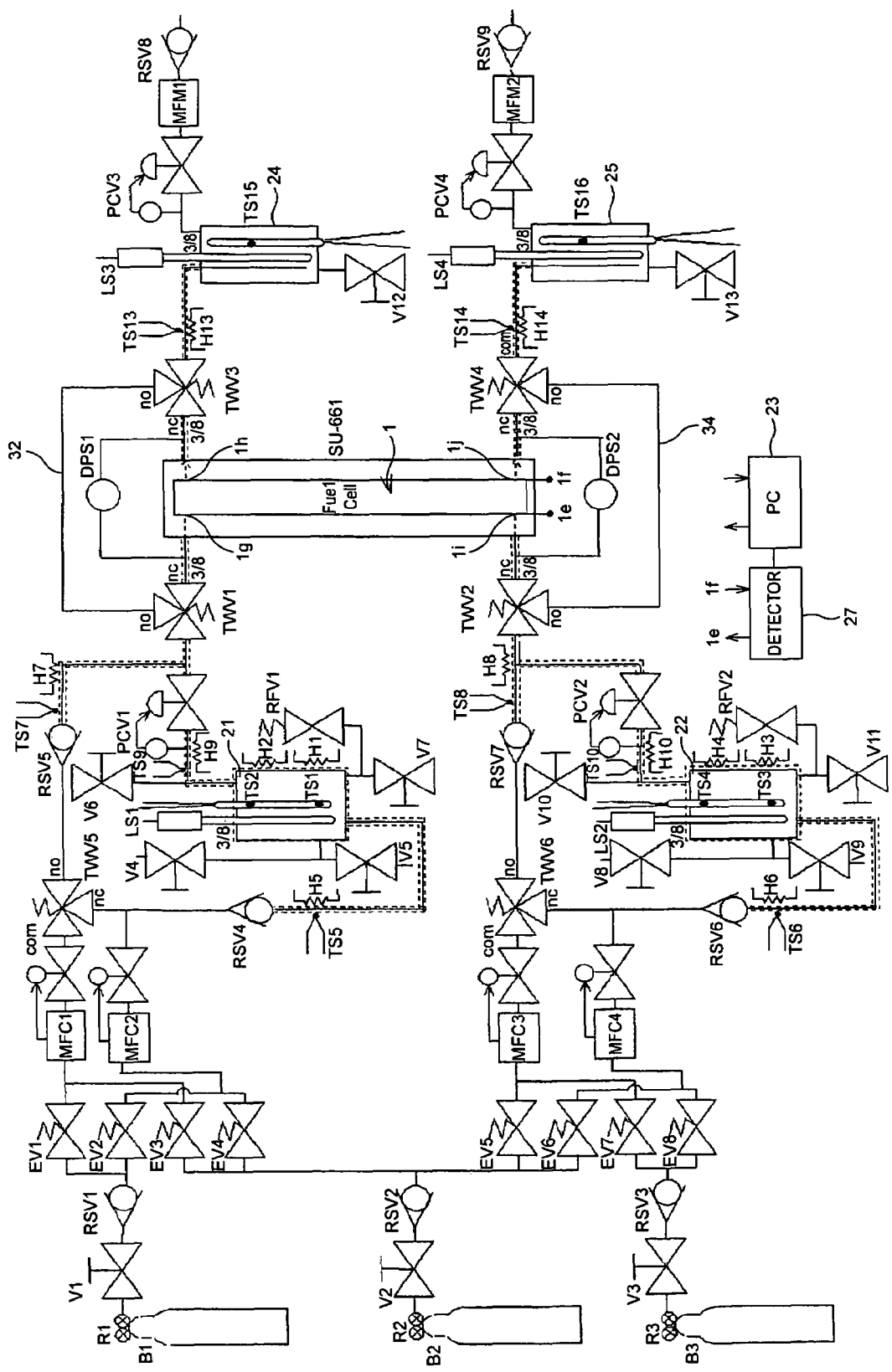
FIG. 1 is a block diagram of a fuel cell evaluation apparatus in accordance with a first embodiment of the present invention.

A fuel cell evaluation apparatus of the present invention, as shown in FIG. 1, evaluates by means of measurement, properties (such as electric properties) of a sample such as a proton-exchange membrane fuel cell (fuel cell) 1, for example. First, the arrangement and operation of the fuel cell 1 will be explained. The fuel cell 1 is provided with an ion-exchange membrane 1a as an electrolytic membrane; and an anode electrode 1b and a cathode electrode 1c respectively located on both surfaces of the ion-exchange membrane 1a so as to tightly sandwich the ion-exchange membrane 1a in a direction of the thickness of the ion-exchange membrane 1a.

The ion-exchange membrane 1a is composed of a porous polymer membrane having continuous pores (each of the pores has a size of from 15 μm to 200 μm). This porous polymer membrane has no electron conductivity, namely has electric insulation, and has ion (proton) conductivity. Accordingly, the ion-exchange membrane 1a is used in a water-containing state, namely is in a humidified state, so as to attain the ion conductivity.

Polymer used for the polymer membrane may be a polymer in which a main chain of fluorocarbon polymer, for example, is bonded with a side chain of fluorocarbon polymer, for example, using ether bond or other method; and a terminal of the side chain is bonded with at least one of sulfonic acid group and carboxyl group which are hydrophilic group.

Namely, the ion-exchange membrane $1a$ is a cation-exchange membrane containing the hydrophilic group. The ion-exchange membrane $1a$ is humidified so as to contain water in the continuous pores, and the hydrophilic group is exposed in the continuous pores so as to form a hydrophilic portion (cluster). This allows hydrogen ion along with two through four water molecules to move and diffuse from the anode electrode $1b$ to the cathode electrode $1c$ through the continuous pores.

The anode electrode $1b$ and cathode electrode $1c$ are composed of paper (porous thin plate) made of carbon, for example. The anode electrode $1b$ and cathode electrode $1c$ have gas permeating and electron conducting properties. Further, the anode electrode $1b$ and cathode electrode $1c$ have fine particles of catalyst for activating fuel gas and oxidizer gas and accelerating reactions on their surfaces by coating. The catalyst is platinum, and platinum-ruthenium, for example.

The fuel cell 1 is further provided with a case $1d$ for containing and holding the ion-exchange membrane $1a$, anode electrode $1b$, and cathode electrode $1c$; and terminals $1e$ and $1f$ for taking out to an external circuit, electric power generated through electricity generation.

For allowing gas to circulate, the case $1d$ is formed to leave spaces from the ion-exchange membrane $1a$, anode electrode $1b$, and cathode electrode $1c$. The terminals $1e$ and $1f$ cause electron (e) generated at the anode electrode $1b$ to be conducted to the cathode electrode $1c$.

The case $1d$ is provided with a fuel supply port (gas supply port) $1g$ for introducing hydrogen gas as fuel gas, and a fuel exhaust port (gas exhaust port) $1h$ on a side of the anode electrode $1b$; and an oxidizer supply port (gas supply port) $1i$ for introducing air containing oxygen gas as oxidizer gas, and an oxidizer exhaust port (gas exhaust port) $1j$ on a side of the cathode electrode $1c$.

Figure 3:
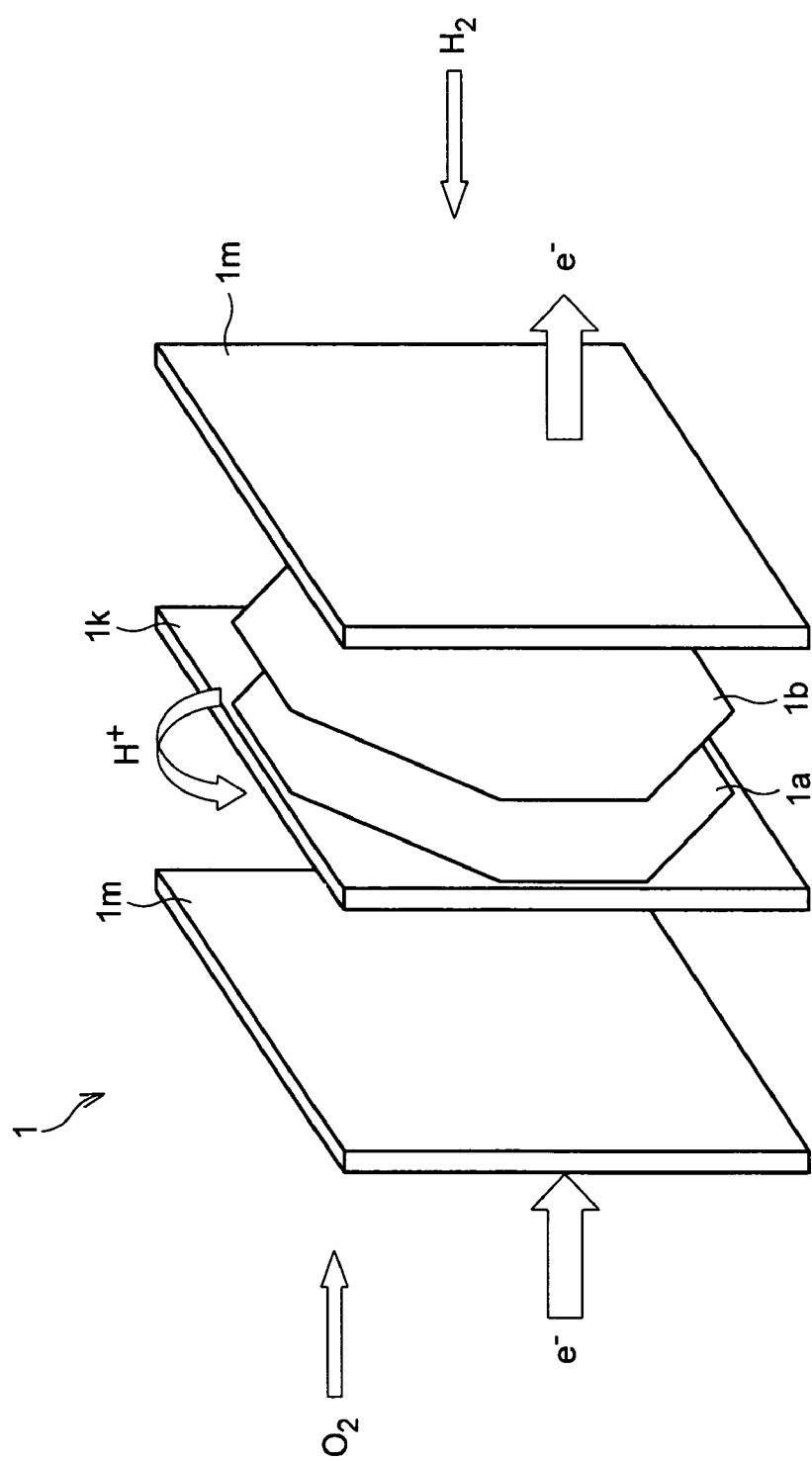
FIG. 3 is an exploded perspective view of chief members of the fuel cell.

The fuel cell 1 is generally used by being superposed (stacked) in a plural number in a direction of the thickness of the fuel cells 1 so that the fuel cells 1 are connected in series. The case $1d$ is thus provided with a seal $1k$ which surrounds the sides of the ion-exchange membrane $1a$, and separators $1m$ which respectively cover both the surfaces of the ion-exchange membrane $1a$, as shown in FIG. 3.

Surfaces of the separators $1m$ that face the ion-exchange membrane $1a$ respectively have grooves (not shown) for conducting and supplying the hydrogen gas or air to the ion-exchange membrane $1a$. The separators $1m$ face each other substantially in parallel so as to sandwich the ion-exchange membrane $1a$, anode electrode $1b$, and cathode electrode $1c$.

Figure 2:
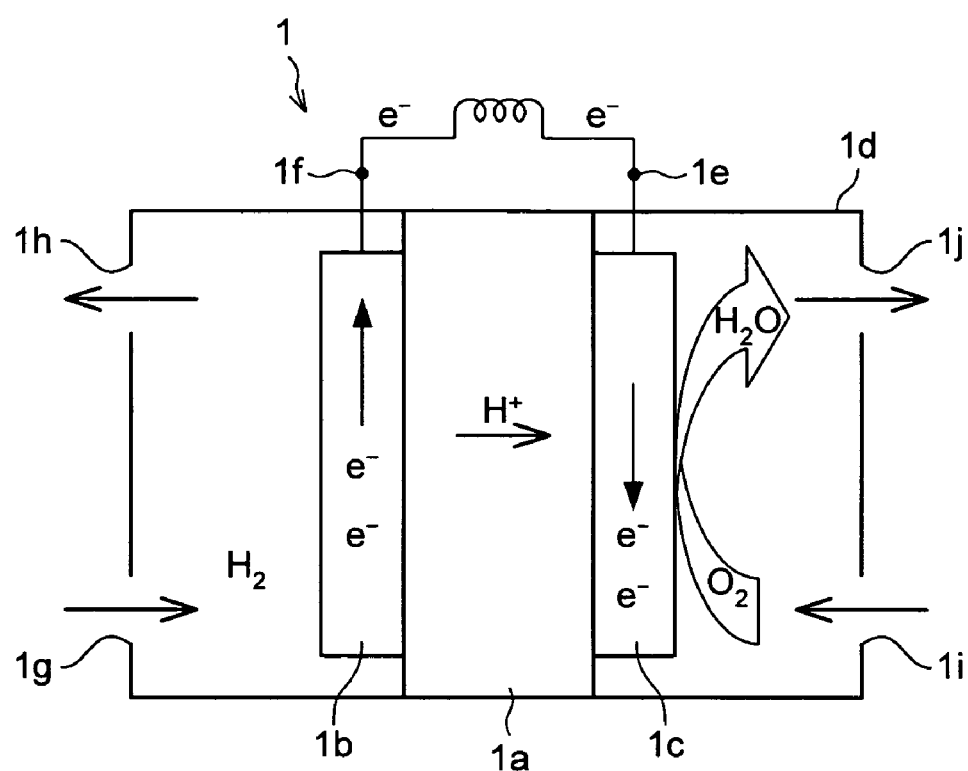
FIG. 2 is a cross-sectional view showing an example of a fuel cell used in the fuel cell evaluation apparatus.

In the fuel cell 1 as described above, hydrogen gas supplied on the anode electrode (fuel electrode) $1b$ under an operating temperature of from room temperature to 150° C. is diffused from the surface to the inside of the anode electrode $1b$. The hydrogen gas is then efficiently separated into hydrogen ion (H+) and electron (e−) due to the catalyst on the anode electrode $1b$, as shown in FIG. 2.

On the other hand, in the fuel cell 1, oxygen gas in the air supplied on the cathode electrode (air electrode) $1c$ is diffused from the surface to the inside of the cathode electrode $1c$. Due to the catalyst on the cathode electrode $1c$, the oxygen gas then efficiently reacts with (A) the hydrogen ion diffused and moved through the ion-exchange membrane $1a$, and (B) the electron conducted and moved through the external circuits via the terminals $1e$ and $1f$, so as to produce water.

From the fuel cell 1 as described above, electric power can be taken out to the outside as the electron moves from the anode electrode $1b$ to the cathode electrode $1c$ via the external circuit.

Further, the fuel cell evaluation apparatus of the present invention is provided with hydrogen fuel gas supplying section B1 for supplying hydrogen ($H_2$) gas (fuel gas) to the fuel cell 1, an inert gas supplying section B2 for supplying inert gas to the fuel cell 1, and an oxygen (oxidizer) gas supplying section B3 for supplying oxygen ($O_2$) gas as oxidizer gas to the fuel cell 1, as shown in FIG. 1. Note that, FIG. 1 shows cylinders as the gas supplying sections. But the gas supplying sections are only required to supply the respective gas, and may be supplying pipes of the respective gas which are connected to the fuel cell 1.

The inert gas may be any gas which can dilute the fuel gas and the oxidizer gas in any concentration, which can be mixed with the fuel gas and the oxidizer gas in any manner without causing any reaction, and which is not involved in electrochemical reactions at the anode electrode $1b$ and cathode electrode $1c$. The inert gas may be argon gas, helium gas, and nitrogen ($N_2$) gas, for example.

Further, in the fuel cell evaluation apparatus, a humidifier 21 for humidifying hydrogen gas is provided in a flow path of hydrogen gas from the hydrogen gas supplying section B1 to the fuel cell 1; and a humidifier 22 for humidifying oxygen gas is provided in a flow path of oxygen gas from the oxygen gas supplying section B3 to the fuel cell 1. Each of the humidifiers 21 and 22 may be a bubbler which bubbles dry gas in water so as to discharge moist (saturated) gas.

The fuel cell evaluation apparatus is provided with traps 24 and 25 which trap and purify exhaust gas from the fuel cell. Exhaust gas from the traps 24 and 25 are discharged via pressure control valves PCV3 and PCV4, respectively, and then via mass flowmeters MFM 1 and MFM 2, respectively.

Further, in the fuel cell evaluation apparatus, a three-way valve (first switching valve) TWV1 in the vicinity of the fuel supply port $1g$ is provided in a gas flow path between the humidifier 21 and the fuel supply port $1g$ of the fuel cell 1; and a three-way valve (second switching valve) TWV3 in the vicinity of the fuel exhaust port $1h$ is provided in a gas flow path between the fuel exhaust port $1h$ of the fuel cell 1 and the trap 24. The remaining ports of the three-way valves TWV1 and TWV3 are connected with each other via a bypass 32.

Further, in the fuel cell evaluation apparatus, a three-way valve (first switching valve) TWV2 in the vicinity of the oxidizer supply port $1i$ is provided in a gas flow path between the humidifier 22 and the oxidizer supply port $1i$ of the fuel cell 1; and a three-way valve (second switching valve) TWV4 in the vicinity of the oxidizer exhaust port $1j$ is provided in a gas flow path between the oxidizer exhaust port $1j$ of the fuel cell 1 and the trap 25. The remaining ports of the three-way valves TWV2 and TWV4 are connected with each other via a bypass 34.

Further, in the fuel cell evaluation apparatus, massflow controllers (gas supply adjusting sections) MFC1 and MFC2 in a dual system, which can adjust a rate of gas supply, are provided in the gas flow path between the hydrogen gas supplying section B1 and the humidifier 21. On the other hand, massflow controllers (gas supply adjusting sections) MFC3 and MFC4 in a dual system, which can adjust a rate of gas supply, are provided in the gas flow path between the oxygen gas supplying section B3 and the humidifier 22.

Further, an electromagnetic valve EV1 is provided between the hydrogen gas supplying section B1 and the massflow controller MFC1, and an electromagnetic valve EV2 is provided between the hydrogen gas supplying section B1 and the massflow controller MFC2. Further, an electromagnetic valve EV7 is provided between the oxygen gas supplying section B3 and the massflow controller MFC3, and an electromagnetic valve EV8 is provided between the oxygen gas supplying section B3 and the massflow controller MFC4. A gas flow path from the inert gas supplying section B2 is connected to the massflow controllers MFC1 through MFC4 via electromagnetic valves EV3 through EV6, respectively.

By providing a system of a plurality of massflow controllers, such as the massflow controllers in a dual system, to the gas flow paths from the hydrogen gas supplying section B1 and the gas flow paths from the oxygen gas supplying section B3 as described above, it is possible to rapidly switch and replace a composition of gas in the fuel cell 1. Further, by connecting the gas flow paths from the inert gas supplying section B2 with the massflow controllers MFC1 through MFC4, it is possible to rapidly change a composition ratio of gas in the fuel cell 1 in a discretionary range.

A three-way valve TWV5 is provided between the massflow controller MFC1 and the humidifier 21, and the remaining port of the three-way valve TWV5 is connected to the gas flow path between the humidifier 21 and the three-way valve TWV1. Likewise, a three-way valve TWV6 is provided between the massflow controller MFC3 and the humidifier 22, and the remaining port of the three-way valve TWV6 is connected to the gas flow path between the humidifier 22 and the three-way valve TWV2.

The three-way valves TWV5 and TWV6 are useful when it is not necessary to humidify the fuel gas such as hydrogen gas and the oxidizer gas such as oxygen gas, namely when at least one of the fuel gas and the oxidizer gas is used in a dry state.

Each of the three-way valves TWV1 through TWV6 as described above has three ports, and, by electromagnetic remote control, selectively switches between two types of combination of two ports among the three ports. Note that, the three-way valves are used as an example in the foregoing explanation of the switching, but each of the valves is only required to switch between two types of combination of two flow paths among the three flow paths. Thus, each of the three-way valves TWV1 through TWV6 may alternatively be a combination of two two-way valves.

Further, as shown in FIG. 1, the fuel cell evaluation apparatus is provided with manual valves V1 through V13, relief valves RFV1 and RFV2, pressure control valves PCV1 and PCV2, water-level sensors LS1 through LS4, temperature sensors TS1 through TS6, differential pressure sensors DPS1 and DPS2, heaters H1 through H14, a temperature-controlled chamber SU-661 for controlling an operating temperature of the fuel cell 1, and a PC (control section) 23.

Further, the humidifiers 21 and 22, and the gas flow paths before and after the humidifiers 21 and 22 are wrapped in layers with heat-insulating material (such as glass wool, indicated by the broken lines in FIG. 1), as shown in FIG. 1.

Further, in the fuel cell evaluation apparatus, a detector 27 is equipped between the terminals 1e and 1f of the fuel cell 1 which are also shown in FIG. 2, in such a manner that the detector 27 is switched ON while measuring. The detector 27 includes (A) an electronic load (not shown), and (B) an impedance meter, an ammeter, and a voltmeter for sensing measurement results. Data detected by the detector 27 is outputted to the PC 23. The electronic load used in the measurement of the properties of the fuel cell 1 may be a current inhaling device.

Figure 4:
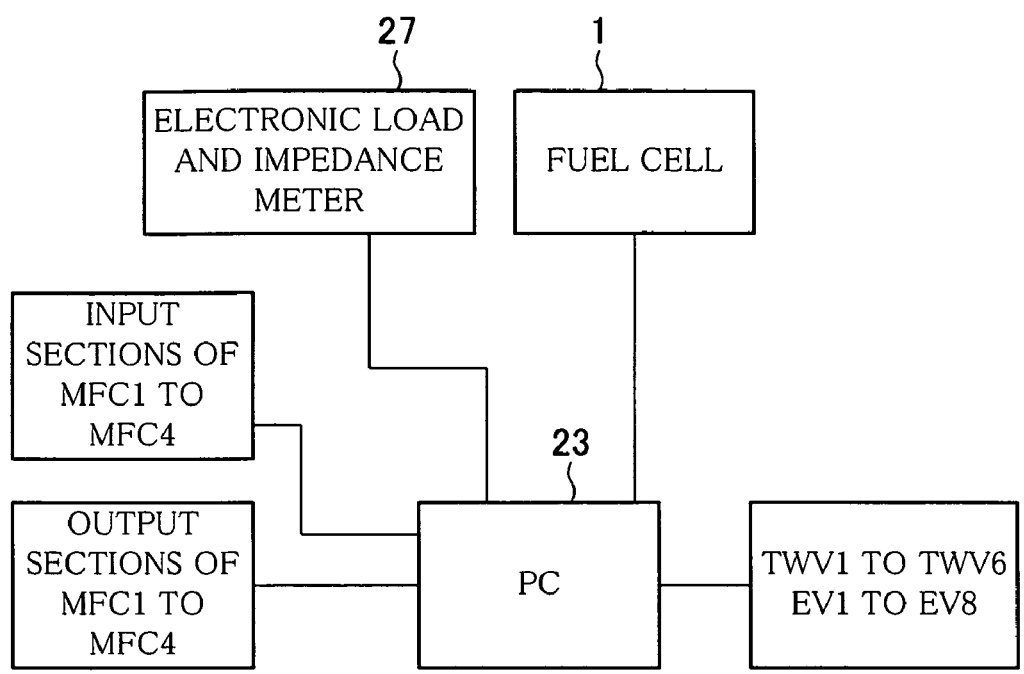
FIG. 4 is a circuit block diagram showing electrical connection in the fuel cell evaluation apparatus.

The PC 23 is provided with a microprocessor, ROM, RAM, hard disk device, display, and printer (not shown). Further, the PC 23 is connected to the sensors, electromagnetic valves, massflow controllers, pressure control valves so as to send and receive measurement data and control data, as shown in FIG. 4.

Therefore, in accordance with (A) the sensors, and (B) a computer-readable and computer-executable program based on the fuel cell evaluation method of the present invention that is stored in the hard disk device, the PC 23 can control the electromagnetic valves, three-way valves, and massflow controllers so as to implement the fuel cell evaluating method, and can receive, calculate, store, display, or print measurement results received from the detector 27.

Next, a first embodiment (gas rush introduction method) in accordance with the fuel cell evaluation method of the present invention will be explained with reference to FIGS. 1, and 4 through 8. First, the electromagnetic valves EV3, EV4, EV5, and EV6, which are connected to the inert gas supplying section B2, are opened (open), and the three-way valves TWV1 through TWV4 are switched ON (so as to communicate with the fuel cell 1; and the bypass 32 between the three-way valves TWV1 and TWV3 and the bypass 34 between the three-way valves TWV2 and TWV4 are shut). With this, an inside the fuel cell 1 is replaced with moist nitrogen gas.

After sufficiently replacing the inside of the fuel cell 1 with the moist nitrogen gas, the three-way valves TWV1 through TWV4 are switched OFF (so as not to communicate with the fuel cell 1; and the bypass 32 between the three-way valves TWV1 and TWV3 and the bypass 34 between the three-way valves TWV2 and TWV4 are open). With this, the inside of the fuel cell 1 is isolated from the gas flow paths (pipes).

Next, the electromagnetic valves EV3, EV4, EV5, and EV6 are closed (close), the electromagnetic valves EV1 and EV2 which are connected to the hydrogen gas supplying section B1 are opened, and the electromagnetic valves EV7 and EV8 which are connected to the oxygen gas supplying section B3 are opened. Then, the massflow controllers MFC1 through MFC4 and the pressure control valves PCV1 through PCV4 are set to predetermined values. With this, the inside of the gas flow paths (pipes) to the fuel cell 1 are replaced with hydrogen gas and oxygen gas.

Following this, the detector 27 having the ammeter and voltmeter starts monitoring when the inside of the gas flow paths (pipes) is sufficiently replaced with the hydrogen gas and oxygen gas, and starts measuring when the voltmeter detects a predetermined voltage value. The measurement in accordance with First Embodiment is to measure how an amount of generated electricity changes after the start of electricity generation by simultaneously switching ON the three-way valves TWV1 through TWV4 so as to rapidly replace nitrogen gas inside the fuel cell 1 with at least one of hydrogen gas and oxygen gas.

In the present embodiment, the inside of the fuel gas flow path and oxidizer gas flow path to the fuel cell 1 is replaced with nitrogen gas which is inert gas, so that a voltage of electricity generation of the fuel cell 1 is 0 V. If the electronic load is kept turned ON in this state, the electronic load applies a reverse bias (performs an operation similar to charging) to the fuel cell 1, due to the characteristics of a generally available electronic load. The application of the reverse bias causes damage to the fuel cell 1.

In order to prevent the problem, the present embodiment is preferably arranged as follows. Namely, the detector 27 constantly monitors an output voltage of the fuel cell 1 after the inside of the fuel cell 1 is replaced with inert gas, and detects a fact that the output voltage reaches the predetermined test start voltage not less than 0 V. Using the detected fact as a trigger, the detector 27 causes the PC 23 to turn ON the electronic load (to connect the electronic load to the fuel cell 1).

By observing and recording a current-voltage profile over time as a transient electrode reaction from the start of electricity generation to the stable period of electricity generation, and then calculating measurement results in accordance with the recorded profile, it is possible to analyze and evaluate the diffusion and electrode reaction inside the fuel cell 1.

Here, all of the three-way valves TWV1 through TWV4 are simultaneously switched so as not to generate different pressures before and after the introduction of gas, namely, a differential pressure inside the gas flow paths of the fuel cell 1. This prevents damage to the ion-exchange membrane 1a which is an electrolytic membrane sandwiched between the gas flow paths.

Further, the measurement is performed while the electronic load is applied, but the system prevents a reverse bias from being applied to the fuel cell even if the inside of the fuel cell has been replaced with inert gas. The operation and measurement of the valves are completely synchronized, and the measurement is performed in a cycle sufficiently fast for measuring a transient phenomenon.

Figure 5:
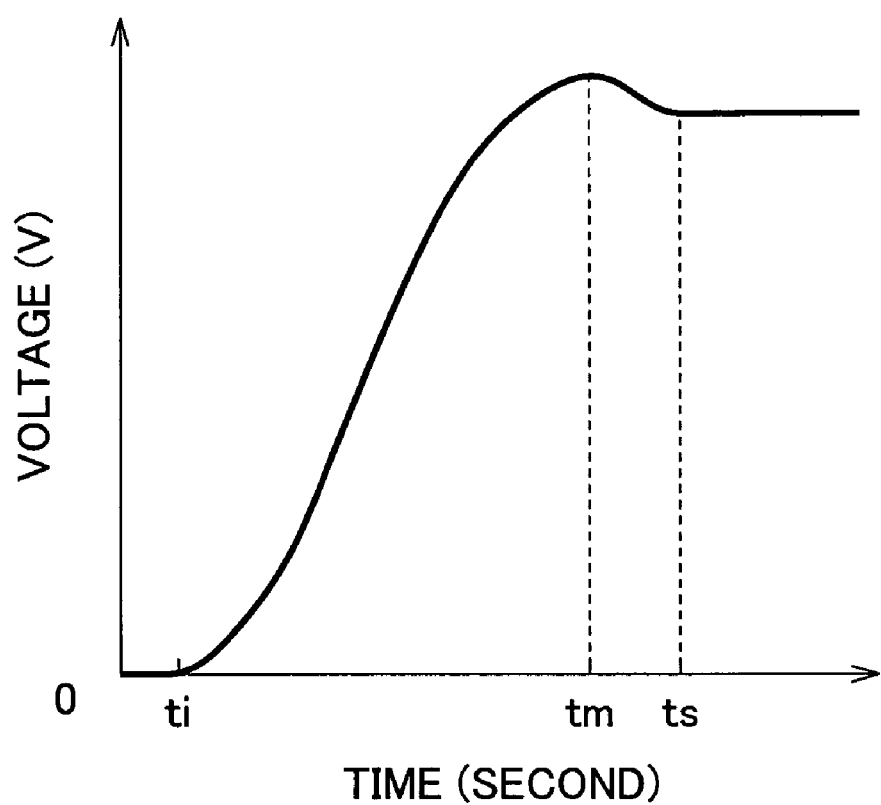
FIG. 5 is a graph showing an example of measurement results in a fuel cell evaluation method using the fuel cell evaluation apparatus in accordance with the first embodiment of the present invention.

FIG. 5(*a*) shows an example of the current-voltage profile in a case where nitrogen gas inside the fuel cell 1 is rapidly replaced by introducing at least one of hydrogen gas and oxygen gas. In the current-voltage profile, in response to the start of introduction of the hydrogen gas and oxygen gas, a voltage (V) starts rising after a time lag, reaches a saturation point (ts) after a certain time, and finally reaches a steady state.

A rise curve indicating the voltage rise has physico-chemical meaning with respect to a rise start time (ti), an inflection point time (tm), and a saturation point (ts) of the rise curve. Therefore, by comparing the profile of the fuel cell 1 with the profile of another fuel cell 1, it is possible to know where and to what extent the fuel cell 1 differs from another fuel cell 1. With this, it is possible to evaluate the properties and performance of the fuel cell 1. The rise start time (ti) depends on a dead volume in the pipes from the valves to the fuel cell 1. Namely, gas concentration inside the fuel cell 1 starts changing after the rise start time (ti).

An analysis example in the gas rush introduction method is indicated as follows. This analysis example indicates that, in the middle of the reaction, intramembranous diffusion is dominant as the overall reaction, and migration becomes dominant over the diffusion when the potential is generated.

A diffusion velocity—$V_{H+}$ is expressed by the following equation (1).

$$v_{H+} = -D_{H+}\frac{\partial C_{H+}}{\partial x} - \frac{D_{H+}C_{H+}}{RT}z_{H+}F\frac{\partial \Phi}{\partial x} \quad (1)$$

$V_{H+}$: diffusion velocity inside electrolytic membrane, $D_{H+}$: diffusion coefficient, $C_{H+}$: concentration, Z: reaction order, R: gas constant, T: absolute temperature, F: Faraday constant, $\Phi$: potential, and x: cathode to anode direction A gradient of intramembranous electric field intensity is assumed to be uniform as indicated by the following equation (1-2).

$$\frac{\partial \Phi}{\partial x} = \frac{\Phi}{d} \quad (1-2)$$

d: membrane thickness

Further, the electronic load controls a generation current to a constant value as indicated by the following equation (1-3).

$$I = eSv_{H+}N_A = \text{const.} \quad (1-3)$$

I: current, e: elementary charge, S: electrode surface area, and $N_A$: Avogadro constant Here, $C_{H+}$ is assumed to linearly depend on an absorption rate of hydrogen gas ($H_2$) to a three-phase surface, as indicated by the following equation (1-4).

$$\frac{dC}{d\tau} = K_1\frac{kT}{h}G\theta_{\sigma(0)}\exp\left(-\frac{\varepsilon_t}{RT}\right)\Big/\frac{QC^1}{QC} \quad (1-4)$$

$K_1$: constant, k: Boltzmann constant, h: Planck constant, G: Gibbs' free energy, $\varepsilon$: heat of absorption, QC: partition function, and $\tau$: time $$\therefore \phi_{ob} = -\left(\frac{Rdh}{K_1kG\theta_{\sigma(0)}\exp\left(-\frac{\varepsilon_t}{RT}\right)D_{H+}Z_{H+}F}\right)\left(\frac{QC^1}{QC}\right)\left(\frac{I}{eSN_A} + D\frac{\partial C}{\partial x}\right)\frac{1}{\tau} - IR_{es}$$

$\Phi_{ob}$: measured voltage, and $R_{es}$: internal resistance

Figure 6:
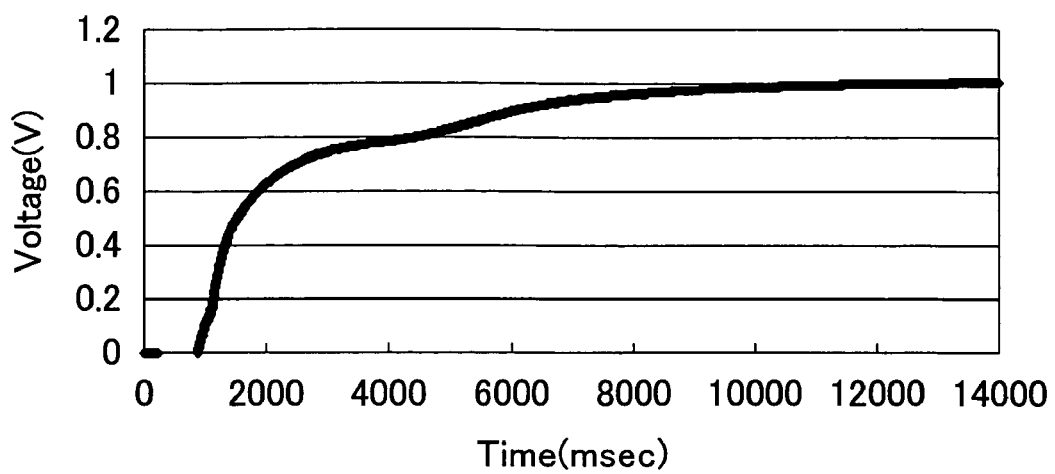
FIGS. 6(a) and 6(b) are graphs showing another example of measurement results in the fuel cell evaluation method using the fuel cell evaluation apparatus in accordance with the first embodiment of the present invention.
Figure 6:
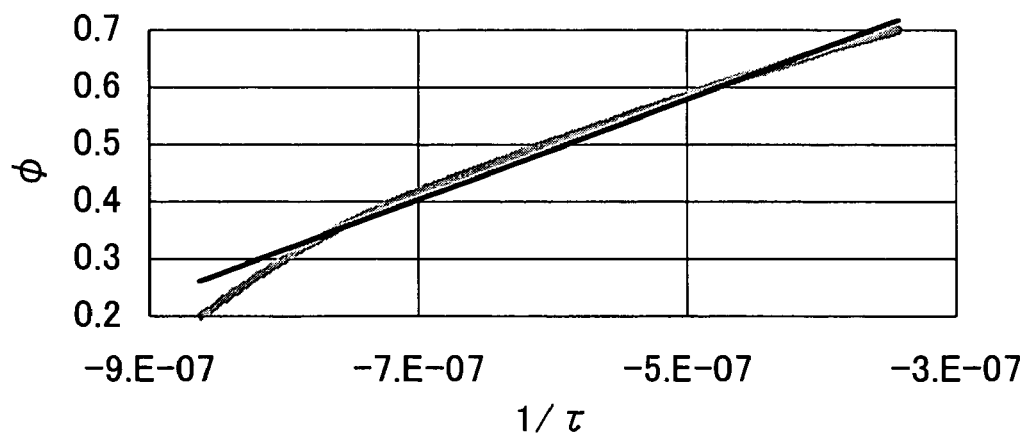

FIG. 6(*a*) shows results of the current-voltage profile in the present analysis example. FIG. 6(*b*) shows results of the obtained profile that is converted into a graph that uses $\phi$ versus $1/\tau$. In this example, a regression line y=862027x+ 1.0112 whose correlation coefficient is $R^2$=0.9886 was obtained.

The slope of the regression line as shown in FIG. 6(*b*) can be used to obtain information including the partition function, Gibbs' free energy, and heat of absorption in the fuel cell 1. Further, the y-intercept of the regression line can be used to obtain information about the internal loss of the fuel cell 1.

Figure 7:
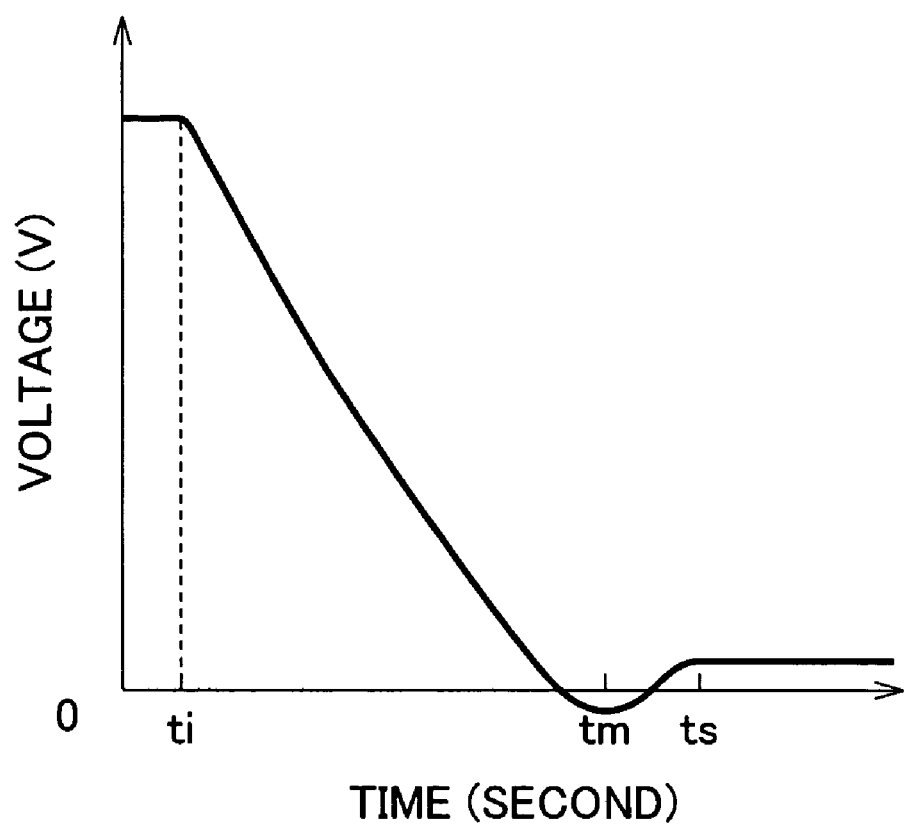
FIG. 7 is a graph showing a further example of measurement results in the fuel cell evaluation method using the fuel cell evaluation apparatus in accordance with the first embodiment of the present invention.

In this manner, with First Embodiment, it is possible to measure the components and electric power generation processes in the fuel cell in a non-destructive manner, while preventing the ion-exchange membrane 1a from being damaged by a reverse bias that occurs in the current interruption method. Note that, the foregoing measurement can be performed by rapidly changing the inside of the fuel cell 1 from 100% hydrogen gas and oxygen gas atmosphere to 0% hydrogen gas and oxygen gas atmosphere (namely 100% nitrogen gas atmosphere). The current-voltage profile in this case is as shown in FIG. 7.

A method for changing the gas concentration inside the fuel cell 1 in the gas rush introduction method should be a method for changing an amount of electricity generation in a short time (in not more than 20 seconds, and preferably in not more than 0.5 second).

The gas concentration may be changed by switching a combination of gas in the fuel cell 1 (1) from nitrogen gas and nitrogen gas to hydrogen gas and oxygen gas, or (2) hydrogen gas and oxygen gas to nitrogen gas and nitrogen gas, as described above. Alternatively, the effect of the present invention can be obtained by changing the combination (3) from nitrogen gas and oxygen gas to hydrogen gas and oxygen gas, (4) from hydrogen gas and nitrogen gas to hydrogen gas and oxygen gas, (5) from hydrogen gas and oxygen gas to nitrogen gas and oxygen gas, or (6) hydrogen gas and oxygen gas to hydrogen gas and nitrogen gas.

Therefore the inert gas atmosphere in the present invention refers to an atmosphere whose combination of gas does not cause the fuel cell 1 to generate electricity, such as combinations of nitrogen gas and nitrogen gas, nitrogen gas and oxygen gas, or hydrogen gas and nitrogen gas.

Figure 8:
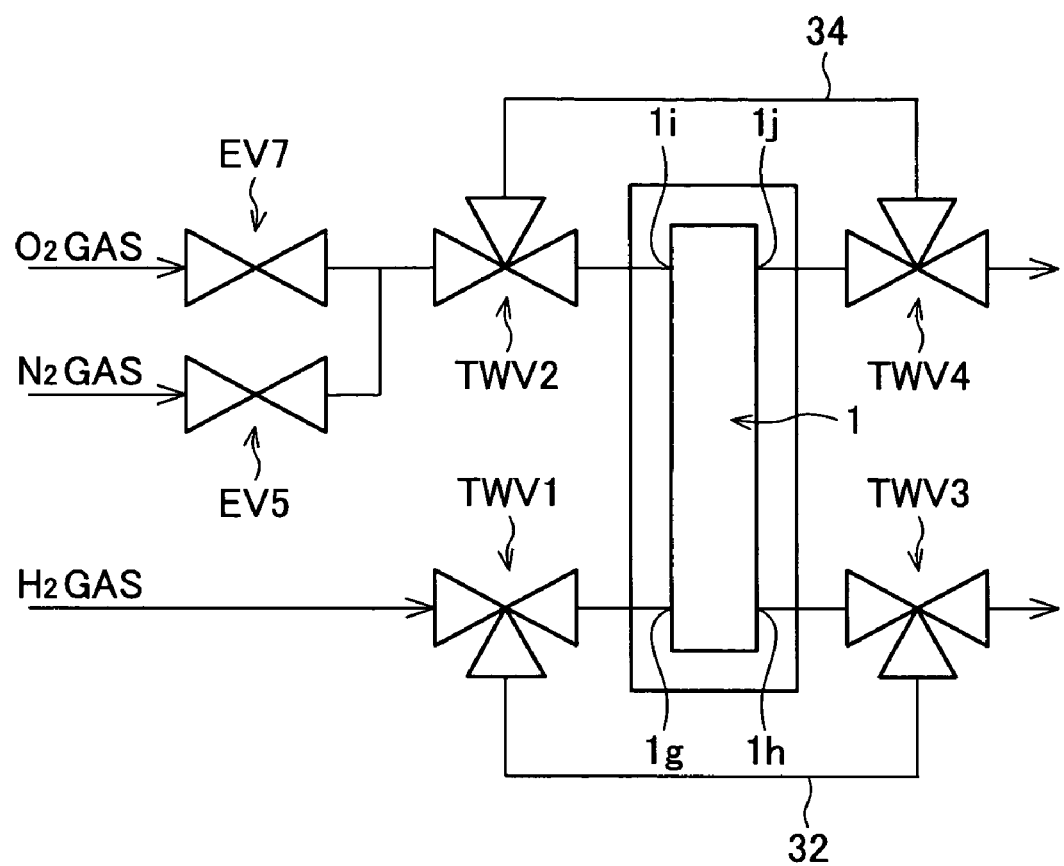
FIG. 8 is a block diagram showing chief members of a variation of the fuel cell evaluation apparatus in accordance with the first embodiment of the present invention.
Figure 9:
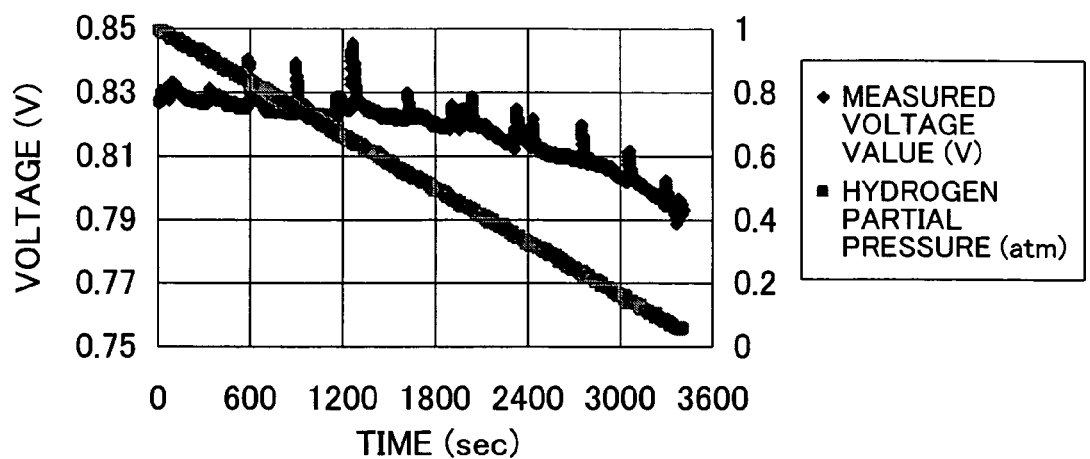
FIG. 9 are graphs showing an example of measurement results in a fuel cell evaluation method using the fuel cell evaluation apparatus in accordance with a second embodiment of the present invention.
Figure 9:
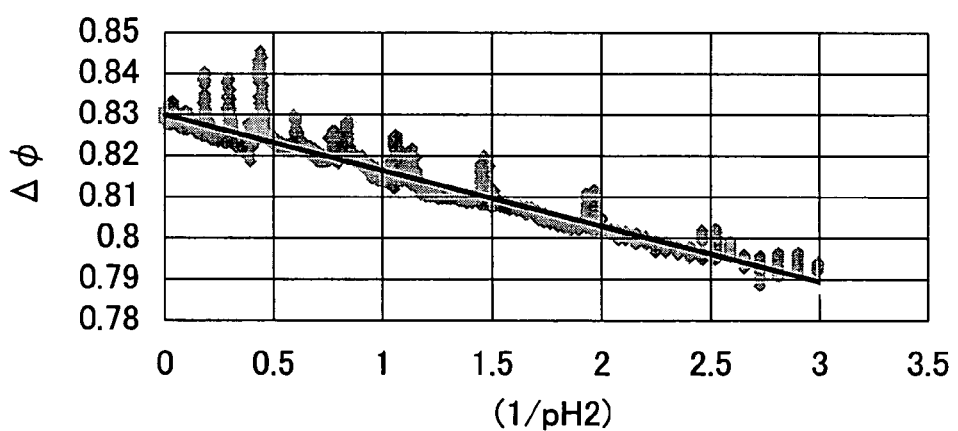

FIG. 8 shows a diagram showing chief members in the fuel cell evaluation apparatus in a case where the combination of gas is switched as in the combination (4), namely, from hydrogen gas and nitrogen gas to hydrogen gas and oxygen gas. In this case, the fuel cell evaluation apparatus is controlled in such a manner that the EV7 is closed, the EV5 is opened, and the TWV1 through TWV4 communicate with the fuel cell 1. With this, the inside of the fuel cell 1 is replaced with hydrogen gas and nitrogen gas. Next, nitrogen to the fuel cell 1 is bypassed by the TWV2 and TWV4, and then the EV7 is opened and the EV5 is closed. With this, the inside of the pipes in which nitrogen gas is filled is replaced with oxygen gas.

Next, the TWV2 and TWV4 are controlled to simultaneously communicate with the fuel cell 1, so that nitrogen gas inside the fuel cell 1 is replaced with oxygen gas in a short time. With this, the properties of the fuel cell 1 can be measured in the gas rush introduction method with respect to the combination (4).

Note that, if the EV7 and the EV5 in the case of the combination (4) are opened and closed in reverse order, the properties of the fuel cell 1 can be measured with respect to the combination (6). As described above, the fuel cell evaluation apparatus of the present invention does not necessarily require all of the arrangements shown in FIG. 1, but may be arranged without needless ones of the arrangements, as shown in FIG. 8.

[Second Embodiment]

The following will explain a second embodiment (concentration gradient method) in the fuel cell evaluation method of the present invention. Note that, the fuel cell evaluation apparatus used in the present embodiment is the fuel cell evaluation apparatus as described in First Embodiment.

In Second Embodiment, first, the electromagnetic valve EV1 connected to the hydrogen gas supplying section B1 as shown in FIG. 1 is opened, the electromagnetic valve EV8 connected to the oxygen gas supplying section B3 is opened, the electromagnetic valves EV4 and EV5 connected to the inert gas supplying section B2 are opened, and the three-way valves TWV5 and TWV6 are switched ON (so as to communicate with the humidifiers 21 and 22, respectively).

Next, the massflow controllers MFC1 through MFC4 are changed so as to monotonously increase or decrease over time, a mixing ratio of hydrogen gas and nitrogen gas which are supplied to the fuel cell 1 and a mixing ratio of oxygen gas and nitrogen gas which are supplied to the fuel cell 1.

Alternatively, the mixing ratios may be changed continuously, intermittently, or stepwise. Further, the mixing ratios should be changed at a speed that can attain either a steady state or a quasi-steady state which is approximately equal to the steady state (not less than 95% of the steady state) with respect to each gas concentration in accordance with each of the changed mixing ratios. A time period for changing the mixing ratios is generally not more than 4000 seconds. Further, depending on a required accuracy of measurement, the period may be 4000 seconds if high accuracy of measurement is required, and may be shortened to about 2000 seconds by reducing points for measuring the gas concentration if high accuracy is not necessary for the measurement.

By observing a continuous current-voltage profile of the terminals 1e and 1f over time from the starting point through the completion point of the changes, it is possible to estimate response characteristics with respect to each gas concentration in accordance with each of the varied mixing ratios, or to estimate a parameter that contributes to the internal reaction of the fuel cell.

The following will explain an analysis example of the concentration gradient method in Second Embodiment. In the concentration gradient method, the concentration of fuel or oxidizer is changed by controlling a gradient of changes (namely, time period and rate of change) in the concentration of the gas. Here, by measuring a transient state from a rich atmosphere to a lean atmosphere or from a lean atmosphere to a rich atmosphere, it is possible to estimate an activity coefficient or to measure the properties and performance of the fuel cell 1.

Incidentally, in a conventional method of changing gas flow rates while retaining the total pressure, it is not possible to change the concentration of fuel or oxidizer, and, in particular, it is questionable whether the lean atmosphere can be correctly realized.

In the concentration gradient method of the present invention, a generated potential $\Phi^M_{eq}$ when the concentration is changed is expressed by the following equation (2).

$$\phi^M_{eq} = \phi^M_0 - V_{loss} - \frac{RT}{2F}\ln\frac{(a^L_{H^+}a^L_{O^{2-}})^2}{P_{O2}P_{H2}} \quad (2)$$

FIG. 9(a) shows results of the concentration gradient method. The results are converted into a graph that uses $\Phi_{M_{eq}}$ versus ln $(1/P_{H2})$ as shown in FIG. 9(b). FIG. 9(b) in accordance with the present analysis example shows a regression line y=−0.0135x+0.8298 whose correlation coefficient $R^2$ is 0.9304. The intercept of the regression line can be used to obtain information as expressed by the following equation (3).

$$\phi^M_0 - V_{loss} - \frac{RT}{2F}\ln\frac{(a^L_{H^+}a^L_{O^{2-}})^2}{P_{O2}} \quad (3)$$

Note that, Second Embodiment used the example where both concentrations of hydrogen gas as fuel gas and oxygen gas as oxidizer gas are gradually decreased. However, it is obviously possible to measure the properties and performance of the fuel cell 1 in a nondestructive manner by changing at least one of the concentrations of fuel gas and oxidizer gas.

Figure 10:
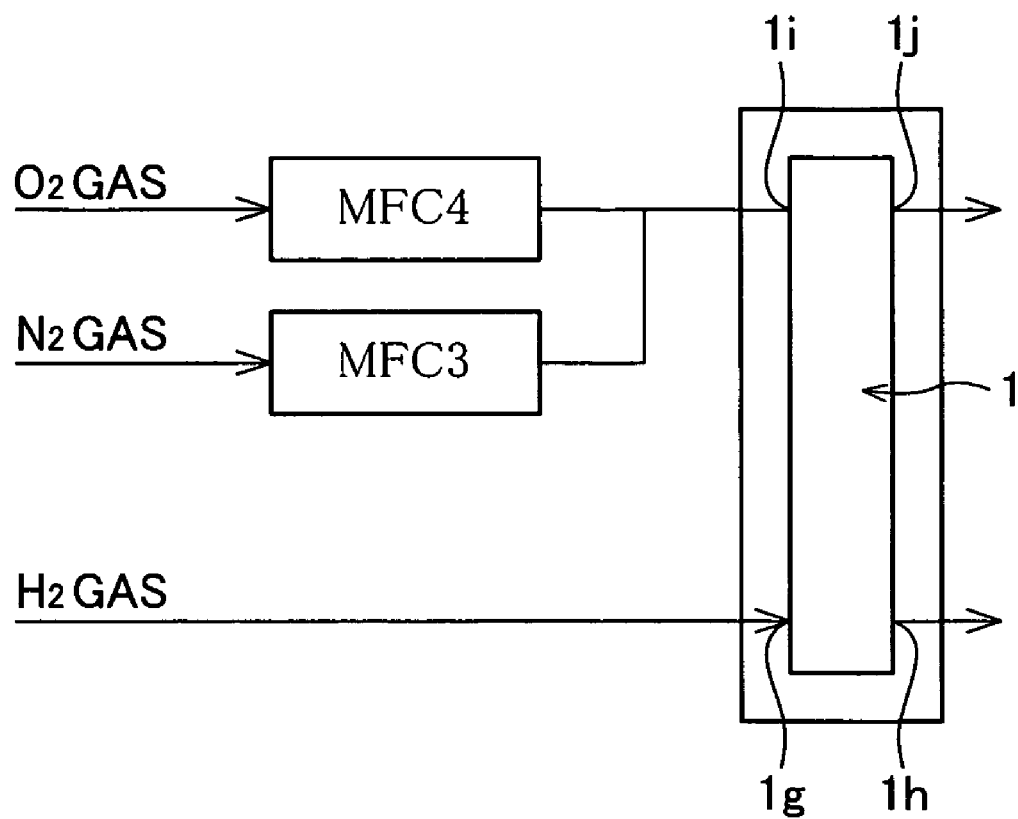
FIG. 10 is a block diagram showing chief members of a variation of the fuel cell evaluation apparatus in accordance with the second embodiment of the present invention.

Further, the present embodiment used the fuel cell evaluation apparatus as shown in FIG. 1. However, if the measurement is performed with respect to gas in the combination (4) or (6) as described above, the fuel cell evaluation apparatus may be arranged as shown in FIG. 10, in which needless arrangements are omitted from the fuel cell evaluation apparatus of FIG. 1 as described above.

[Third Embodiment]

The following will explain a third embodiment (humidity gradient method) in the fuel cell evaluation method of the present invention. Note that, the fuel cell evaluation apparatus used in the present embodiment is the fuel cell evaluation apparatus as described in First Embodiment.

The humidity gradient method in accordance with Third Embodiment is for evaluating a humidity dependence of gas introduced to the fuel cell when the fuel cell is actually used. This method mainly evaluates the relationship between an internal resistance of the ion-exchange membrane 1*a* and an amount of moisture absorption of the ion-exchange membrane 1*a*. Alternatively, this method evaluates lowering of electric power which is caused by fluttering (blocking because of dew condensation) due to a humidity of the introduced gas. Thus, this method can be used for judging whether or not the separators (flow paths) are designed in a non-defective manner. Of course, this method can also evaluate the fuel cell 1 in gross. In this method, the humidity may be changed either continuously or stepwise.

The internal resistance and the amount of moisture absorption may be evaluated by mainly controlling the humidity of fuel gas to be introduced. The fluttering may be evaluated by controlling the humidity of oxidizer gas.

The humidity in the fuel cell 1 may be controlled by introducing 100% RH (relative humidity) moist (saturated) gas first, then gradually decreasing the flow rate of the moist gas and instead increasing the flow rate of dry gas, while retaining the total gas pressure during the process. Alternatively, the humidity may be controlled in a reverse order by introducing dry gas first, then gradually decreasing the flow rate of the dry gas and instead increasing the flow rate of moist (saturated) gas, while retaining the total gas pressure during the process.

A current-voltage profile here is measured in the method as described above. Results of the measurement conclude that the fuel cell 1 has the ion-exchange membrane having relatively high resistance to dryness if a decrease in the output voltage of the fuel cell 1 in response to the decrease in the humidity of fuel gas is relatively smaller than a decrease in the output voltage of another fuel cell similarly measured.

Further, also in the case where the humidity of oxidizer gas is changed to increase, the results of the measurement conclude that the measured fuel cell 1 has a structure that is relatively hard to cause fluttering if a decrease in the output voltage of the measured fuel cell 1 is relatively smaller than a decrease in the output voltage of another fuel cell 1 similarly measured.

Figure 11:
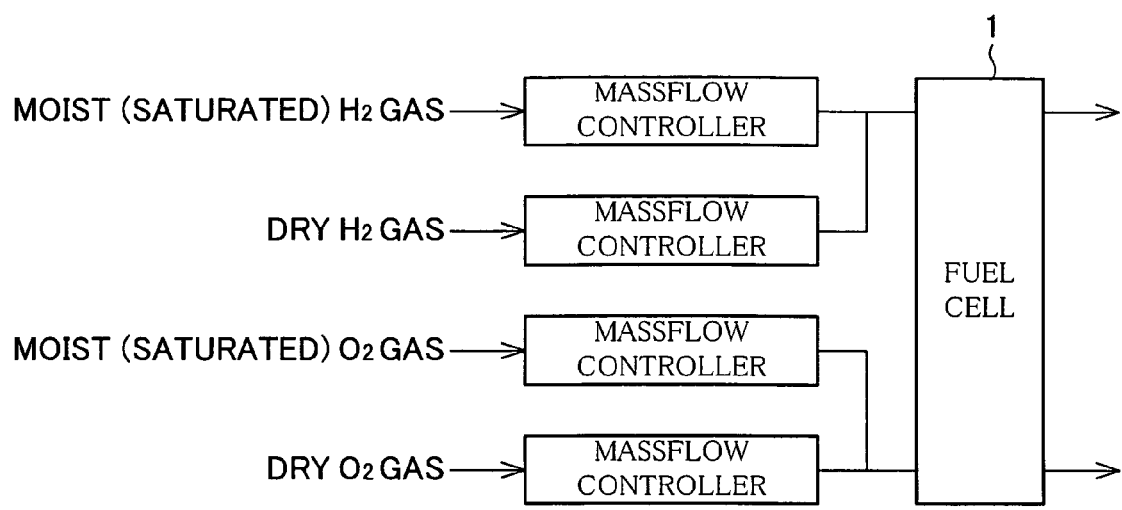
FIG. 11 is a block diagram showing chief members of a fuel cell evaluation apparatus in accordance with a third embodiment of the present invention.

The humidity gradient method in accordance with the present embodiment can be performed with respect to the fuel cell 1 that is provided with at least a dry gas supplying system, a moist gas supplying system, and flow rate control system (massflow controller) (see FIG. 11).

Any two or all of First through Third Embodiments may be combined together for the measurement. If all First through Third Embodiments are employed for the measurement, the fuel cell evaluation apparatus shown in FIG. 1 may be used as a preferable example.

Figure 12:
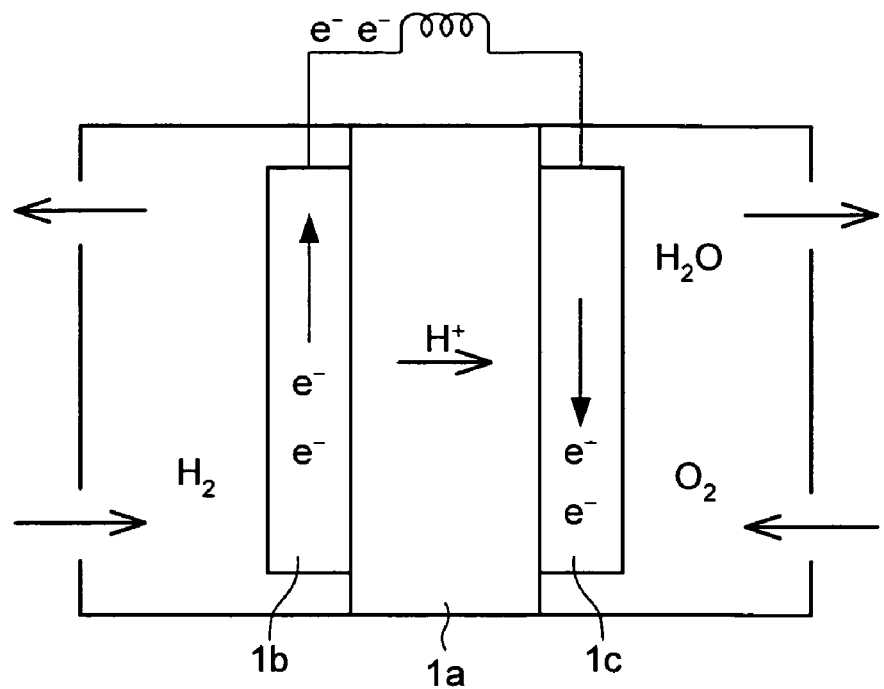
FIG. 12 is a cross-sectional view schematically showing another example of the fuel cell.
Figure 13:
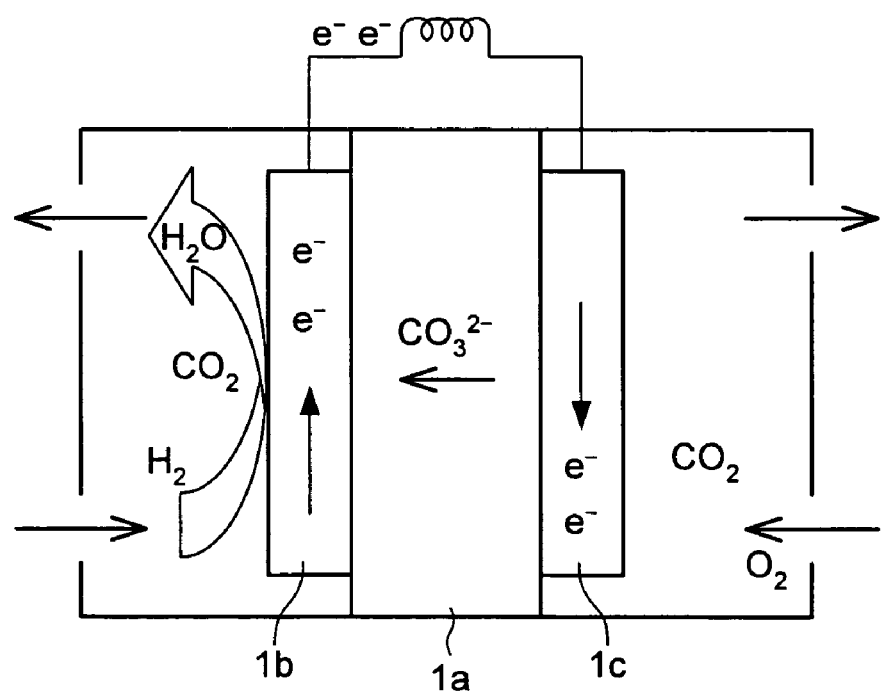
FIG. 13 is a cross-sectional view schematically showing a further example of the fuel cell.
Figure 14:
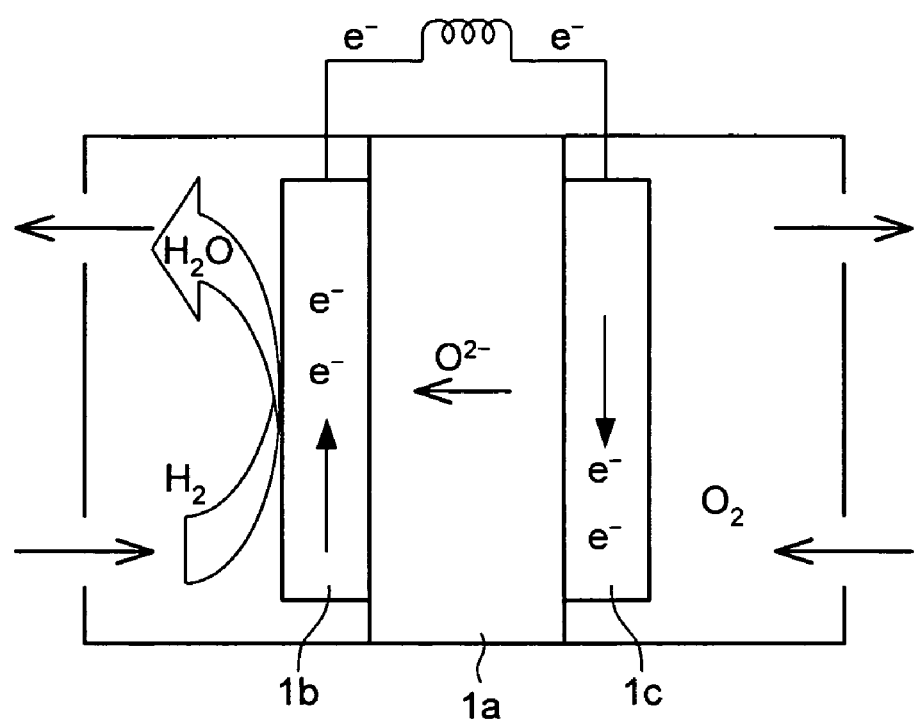
FIG. 14 is a cross-sectional view schematically showing yet another example of the fuel cell.

Further, in Embodiments, the proton-exchange membrane fuel cell is used as an example of the fuel cell 1. But the present invention can be applied to any fuel cell in which ion diffuses and moves inside the ion-exchange membrane 1*a* which is an electrolyte, and fuel gas and oxidizer gas diffuses and moves inside the anode electrode 1*b* and the cathode electrode 1*c*. For example, the present invention is effectively applied to a phosphoric acid fuel cell which uses phosphoric acid as electrolyte, as shown in FIG. 12, for example; a fused carbonate fuel cell which uses fused carbonate as electrolyte, as shown in FIG. 13, for example; and a solid oxide fuel cell which uses stabilized zirconia as electrolyte, as shown in FIG. 14, for example.

Further, pure hydrogen gas is used as fuel gas in Embodiments, but, alternatively, other fuel gas such as methanol, modified gas, and natural gas may be used either alone or by mixture.

Further, pure oxygen gas is used as oxidizer gas in Embodiments, but, alternatively, other oxidizer gas such as air, and mixed gas that contains oxygen gas and other type(s) of oxidizer gas may be used.

As described above, as industrial applicable characteristics, the fuel cell evaluation method and fuel cell evaluation apparatus of the present invention can be appropriately used for evaluating the properties of a fuel cell.

A method for evaluating a fuel cell of the present invention is arranged so as to sequentially include the steps of (i) setting an inside of the fuel cell to an inert gas atmosphere; and (ii) introducing into the fuel cell at least one of fuel gas and oxidizer gas in such a manner that an amount of electricity generated by the fuel cell changes, so as to detect changes of the amount of electricity generated by the fuel cell over time.

Note that, the inert gas atmosphere refers to an atmosphere whose combination of gas does not cause electricity generation inside the fuel cell, and the combination of gas may be inert gas and inert gas, inert gas and oxidizer gas, or fuel gas and inert gas, for example.

Another method for evaluating a fuel cell of the present invention is arranged so as to sequentially include the steps of (i) setting an inside of the fuel cell to at least one of a fuel gas atmosphere and an oxidizer gas atmosphere; and (ii) introducing inert gas into the fuel cell that is generating electricity, so as to detect changes of an amount of electricity generated by the fuel cell over time.

The method for evaluating a fuel cell may be so arranged that a transient reaction of an electrode inside the fuel cell is measured by detecting the changes of the amount of electricity generated by the fuel cell. The method for evaluating a fuel cell may be so arranged that a time for changing a concentration of the gas in the fuel cell is set to not more than 20 seconds, and more preferably not more than 0.5 second.

A further method for evaluating a fuel cell of the present invention is arranged so as to sequentially include the steps of (i) introducing into the fuel cell at least one of fuel gas and oxidizer gas so as to cause the fuel cell to generate electricity; and (ii) decreasing or increasing a concentration of the at least one of fuel gas and oxidizer gas in the fuel cell at predetermined speed by introducing inert gas, so as to detect changes of an amount of electricity generated by the fuel cell over time.

The method for evaluating a fuel cell may be so arranged that in the step (ii), a steady state inside the fuel cell is sequentially measured at respective time points where the gas in the fuel cell is in different concentrations. The method for evaluating a fuel cell may be so arranged that a time for changing a concentration of the gas in the fuel cell is set to not more than 4000 seconds. The method for evaluating a fuel cell may be so arranged that a concentration of the gas in the fuel cell is changed stepwise in the step (ii).

With these methods, by changing the gas composition inside the fuel cell in a short period (in not more than 20 seconds, and preferably in not more than 0.5 second), it is possible to detect how the amount of electricity generated in the fuel cell changes over time, so as to measure a transient reaction. Alternatively, it is also possible to sequentially measure the steady state of the fuel cell with respect to each of different gas concentrations inside the fuel cell by changing the gas composition inside the fuel cell over a long period (not more than 4000 seconds) either gradually or stepwise.

With this, it is possible to obtain information about states of the fuel cell in each of processes such as a diffusion process of gas into the electrodes in the fuel cell, a reaction process at the electrodes (for example, a process of resolving hydrogen gas into proton and electron, and a process of synthesizing water from oxygen gas, the proton, and the electron), and a proton shift process inside the electrolytic membrane in the fuel cell.

With the foregoing methods, it is therefore possible to more surely learn in accordance with the obtained information, the properties and performance of the fuel cell, thereby evaluating the fuel cell more accurately.

The method for evaluating a fuel cell is preferably arranged so that the gas is introduced in such a manner as to prevent a differential pressure in the fuel cell. With this method, it is possible to prevent a differential pressure from being produced in the fuel cell in the measurement, thereby preventing damage to the fuel cell.

A fuel cell evaluation apparatus of the present invention is arranged so as to include a fuel cell for generating electricity using fuel gas and oxidizer gas; a fuel gas supplying section for supplying the fuel gas; an oxidizer gas supplying section for supplying the oxidizer gas; an inert gas supplying section for supplying inert gas; a detection section for detecting an amount of electricity generated by the fuel cell; a bypass for interconnecting a gas supply port of the fuel cell with a gas exhaust port of the fuel cell; a first switching valve provided in the vicinity of the gas supply port of the fuel cell, the first switching valve supplying to either the gas supply port or the bypass, one or more of the fuel gas, the oxidizer gas, and the inert gas; a second switching valve provided in the vicinity of the gas exhaust port of the fuel cell, the second switching valve discharging one or more of the fuel gas, the oxidizer gas, and the inert gas supplied from either the gas exhaust port or the bypass; and a control section for replacing one or more of the fuel gas, the oxidizer gas, and the inert gas inside the fuel cell by controlling at least one of the first switching valve and the second switching valve.

With this arrangement, the amount of electricity generated by the fuel cell is detected when an amount of at least one of the fuel gas and the oxidizer gas is changed. Therefore it is possible to obtain information about states of the fuel cell in each of the processes as described above.

With this, it is therefore possible to more surely learn the properties and performance of the fuel cell, thereby evaluating the fuel cell more accurately.

Further, in this arrangement, by means of the control section, the first switching valve, and the second switching valve, gas inside the bypass and inside the gas flow paths from the gas supplying sections to the first switching valve are replaced with gas that differs from gas inside the fuel cell, before the first and second switching valves are switched. With this, it is possible to smoothly and more precisely replace gas inside the fuel cell with another gas.

Namely, with this arrangement, it is possible to detect an amount of electricity generated in the fuel cell by smoothly and more precisely replacing the gas inside the fuel cell with another gas as described above. Therefore it is possible to more accurately obtain information about states (for example, properties and performance) of the fuel cell with respect to each of the processes as described above.

With this arrangement, it is therefore possible to more surely learn the properties and performance of the fuel cell, thereby evaluating the fuel cell more accurately.

The fuel cell evaluation apparatus of the present invention may be so arranged that the control section controls the first switching valve and the second switching valve so that the first switching valve and the second switching valve simultaneously switch to either (A) gas flow paths to the fuel cell or (B) the bypass.

With this arrangement, the first switching valve and the second switching valve simultaneously switch to either (A) gas flow paths to the fuel cell or (B) the bypass. Therefore it is possible to prevent a differential pressure from being produced in the fuel cell, thereby preventing damage to the fuel cell.

Another fuel cell evaluation apparatus of the present invention is arranged so as to include a fuel cell for generating electricity using fuel gas and oxidizer gas; a fuel gas supply adjusting section for adjusting an amount of the fuel gas to be supplied to the fuel cell; an oxidizer gas supply adjusting section for adjusting an amount of the oxidizer gas to be supplied to the fuel cell; an inert gas adjusting section for adjusting an amount of inert gas to be supplied to the fuel cell; a detection section for detecting an amount of electricity generated by the fuel cell; and a control section for controlling the fuel gas supply adjusting section, the oxidizer gas supply adjusting section, and the inert gas supply adjusting section, so as to adjust by use of the inert gas, a concentration of at least one of the fuel gas and the oxidizer gas in the fuel cell while retaining a gas pressure in the fuel cell.

With this arrangement, while changing the gas concentration inside the fuel cell either gradually or stepwise, it is possible to measure the steady state of the fuel cell with respect to each of the different gas concentrations inside the fuel cell. Therefore it is possible to obtain information about states of the fuel cell in each of the processes as described above.

With this arrangement, it is therefore possible to more surely learn the properties and performance of the fuel cell, thereby evaluating the fuel cell more accurately.

Further, this arrangement adjusts the gas concentration inside the fuel cell while retaining the gas pressure to the fuel cell. Therefore it is possible to prevent a differential pressure from being produced in the fuel cell, thereby preventing damage to the fuel cell even if the gas concentration in the fuel cell is varied.

As described above, a fuel cell evaluation method and fuel cell evaluation apparatus of the present invention detect an amount of electricity generated by a fuel cell while varying gas inside the fuel cell over time.

With these method and apparatus, it is possible to obtain information about states inside the fuel cell in each of the processes of electricity generation. Therefore it is possible to more surely learn the properties and performance of the fuel cell, thereby evaluating the fuel cell more accurately.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A method for evaluating a fuel cell, sequentially comprising the steps of:
   (i) setting an inside of said fuel cell to an inert gas atmosphere; and
   (ii) introducing into said fuel cell at least one of fuel gas and oxidizer gas so that an amount of electricity generated by said fuel cell changes, so as to detect changes of the amount of electricity generated by said fuel cell over time,
   wherein the gas is introduced in said step (ii) so as to prevent a differential pressure in said fuel cell and
   in said step (ii), a steady state inside said fuel cell is sequentially measured at respective time points where the gas in said fuel cell is in different concentrations.
   wherein the gas is introduced in said step (ii) so as to prevent a differential pressure in said fuel cell, and
   in said step (ii), a steady state inside said fuel cell is sequentially measured at respective time points where the gas in said fuel cell is in different concentrations.

2. The method for evaluating a fuel cell as set forth in claim 1, wherein:
   a transient reaction of an electrode inside said fuel cell is measured by detecting the changes of the amount of electricity generated by said fuel cell.

3. The method for evaluating a fuel cell as set forth in claim 2, wherein:
   a time for changing the concentrations of the gas in said fuel cell is set to not more than 20 seconds.

4. The method for evaluating a fuel cell as set forth in claim 2, wherein:
   a time for changing the concentrations of the gas in said fuel cell is set to not more than 0.5 second.

5. A method for evaluating a fuel cell, sequentially comprising the steps of:
   (i) setting an inside of said fuel cell to at least one of a fuel gas atmosphere and an oxidizer gas atmosphere; and
   (ii) introducing inert gas into said fuel cell that is generating electricity, so as to detect changes of an amount of electricity generated by said fuel cell over time,
   wherein the gas is introduced in said step (ii) so as to prevent a differential pressure in said fuel cell, and
   in said step (ii), a steady state inside said fuel cell is sequentially measured at respective time points where the gas in said fuel cell is in different concentrations.

6. The method for evaluating a fuel cell as set forth in claim 5, wherein:
   a transient reaction of an electrode inside said fuel cell is measured by detecting the changes of the amount of electricity generated by said fuel cell.

7. The method for evaluating a fuel cell as set forth in claim 6, wherein:
   a time for changing the concentrations of the gas in said fuel cell is set to not more than 20 seconds.

8. The method for evaluating a fuel cell as set forth in claim 6, wherein:
   a time for changing the concentrations of the gas in said fuel cell is set to not more than 0.5 second.

9. A fuel cell evaluation apparatus, comprising:
   a fuel cell for generating electricity using fuel gas and oxidizer gas;
   a fuel gas supplying section for supplying the fuel gas;
   an oxidizer gas supplying section for supplying the oxidizer gas;
   an inert gas supplying section for supplying inert gas;
   a detection section for detecting an amount of electricity generated by said fuel cell;
   a bypass for interconnecting a gas supply port of said fuel cell with a gas exhaust port of said fuel cell;
   a first switching valve provided in the vicinity of said gas supply port of said fuel cell, said first switching valve supplying to either said gas supply port or said bypass, one or more of the fuel gas, the oxidizer gas, and the inert gas;
   a second switching valve provided in the vicinity of said gas exhaust port of said fuel cell, said second switching valve discharging one or more of the fuel gas, the oxidizer gas, and the inert gas supplied from either said gas exhaust port or said bypass; and
   a control section for replacing one or more of the fuel gas, the oxidizer gas, and the inert gas inside the fuel cell by controlling at least one of said first switching valve and said second switching valve.

10. The fuel cell evaluation apparatus as set forth in claim 9, wherein:
    said control section controls said first switching valve and said second switching valve so that said first switching valve and said second switching valve simultaneously switch to either (A) gas flow paths to said fuel cell or (B) said bypass.

11. A method for evaluating a fuel cell, sequentially comprising the steps of:
    (i) setting an inside of said fuel cell to an inert gas atmosphere; and
    (ii) detecting changes in an amount of electricity generated by said fuel cell over time by introducing into said fuel cell at least one of fuel gas and oxidizer gas,
    wherein the gas is introduced in said step (ii) so as to prevent a differential pressure in said fuel cell, and
    in said step (ii), a steady state inside said fuel cell is sequentially measured at respective time points where the gas in said fuel cell is in different concentrations.

12. The method for evaluating a fuel cell as set forth in claim 11, wherein:
    a time for changing the concentrations of the gas in said fuel cell is set to not more than 20 seconds.

13. The method for evaluating a fuel cell as set forth in claim 11, wherein:
    a transient reaction of an electrode inside said fuel cell is measured by detecting the changes of the amount of electricity generated by said fuel cell.

14. A method for evaluating a fuel cell, sequentially comprising the steps of:
    (i) setting an inside of said fuel cell to at least one of a fuel gas atmosphere and an oxidizer gas atmosphere; and
    (ii) detecting changes in the amount of electricity generated by said fuel cell over time by introducing inert gas into said fuel cell that is generating electricity,
    wherein the gas is introduced so as to prevent a differential pressure in said fuel cell, and
    in said step (ii), a steady state inside said fuel cell is sequentially measured at respective time points where the gas in said fuel cell is in different concentrations.

15. The method for evaluating a fuel cell as set forth in claim 14, wherein:
    a transient reaction of an electrode inside said fuel cell is measured by detecting the changes of the amount of electricity generated by said fuel cell.

16. A method for evaluating a fuel cell, sequentially comprising the steps of:
    (i) setting an inside of said fuel cell to an inert gas atmosphere; and
    (ii) introducing into said fuel cell at least one of fuel gas and oxidizer gas so that an amount of electricity generated by said fuel cell changes, so as to detect changes of the amount of electricity generated by said fuel cell over time, wherein the gas is introduced in said step (ii) so as to prevent a differential pressure in said fuel cell, and a transient reaction of an electrode inside said fuel cell is measured by detecting the changes of the amount of electricity generated by said fuel cell.

17. A method for evaluating a fuel cell, sequentially comprising the steps of:
   (i) setting an inside of said fuel cell to at least one of a fuel gas atmosphere and an oxidizer gas atmosphere; and
   (ii) introducing inert gas into said fuel cell that is generating electricity, so as to detect changes of an amount of electricity generated by said fuel cell over time,
   wherein the gas is introduced in said step (ii) so as to prevent a differential pressure in said fuel cell, and
   a transient reaction of an electrode inside said fuel cell is measured by detecting the changes of the amount of electricity generated by said fuel cell.

18. A method for evaluating a fuel cell, sequentially comprising the steps of:
   (i) setting an inside of said fuel cell to an inert gas atmosphere; and
   (ii) detecting changes in an amount of electricity generated by said fuel cell over time by introducing into said fuel cell at least one of fuel gas and oxidizer gas,
   wherein the gas is introduced in said step (ii) so as to prevent a differential pressure in said fuel cell, and
   a transient reaction of an electrode inside said fuel cell is measured by detecting the changes of the amount of electricity generated by said fuel cell.

19. A method for evaluating a fuel cell, sequentially comprising the steps of:
   (i) setting an inside of said fuel cell to at least one of a fuel gas atmosphere and an oxidizer gas atmosphere; and
   (ii) detecting changes in the amount of electricity generated by said fuel cell over time by introducing inert gas into said fuel cell that is generating electricity,
   wherein the gas is introduced so as to prevent a differential pressure in said fuel cell, and
   a transient reaction of an electrode inside said fuel cell is measured by detecting the changes of the amount of electricity generated by said fuel cell.

* * * * *